United States Patent [19]

Takeuchi et al.

[11] Patent Number: 4,719,460
[45] Date of Patent: Jan. 12, 1988

[54] KEYLESS ENTRY SYSTEM FOR AUTOMOTIVE VEHICLE DEVICES WITH THEFT-PREVENTION FEATURE

[75] Inventors: Mikio Takeuchi; Kinichiro Nakano, both of Zama; Motoki Hirano, Yokohama, all of Japan

[73] Assignee: Nissan Motor Company, Limited, Yokohama, Japan

[21] Appl. No.: 651,782

[22] Filed: Sep. 18, 1984

[30] Foreign Application Priority Data

Sep. 19, 1983 [JP] Japan .................. 58-172685
Sep. 26, 1983 [JP] Japan .................. 58-177484

[51] Int. Cl.$^4$ .................. G06F 7/04; G08C 19/00; B60R 25/00
[52] U.S. Cl. .................. 340/825.31; 340/52 D; 340/825.69; 340/825.54; 340/63; 180/287; 307/10 AT; 70/252; 70/256
[58] Field of Search .................. 340/825.3, 542, 52 D, 340/825.32, 572, 825.69, 825.54, 825.76, 528, 63, 64, 65, 825.31, 52 R, 52 F, 53; 70/252, 256, 257; 180/287; 307/10 AT; 455/603

[56] References Cited

U.S. PATENT DOCUMENTS

| | | | |
|---|---|---|---|
| 3,196,440 | 7/1965 | Weinstein | 340/825.72 |
| 3,399,554 | 9/1968 | Hogue | 70/262 |
| 3,723,967 | 3/1973 | Atkins et al. | 340/64 |
| 3,866,168 | 2/1975 | McGuirk, Jr. | 307/10 AT |
| 3,891,980 | 6/1975 | Lewis et al. | 340/572 |
| 4,137,985 | 2/1979 | Winchell | 307/10 AT |
| 4,143,368 | 3/1979 | Route et al. | 455/603 |
| 4,151,507 | 4/1979 | Willis | 340/64 |
| 4,205,325 | 5/1980 | Haygood et al. | 340/825.32 |
| 4,240,516 | 12/1980 | Henderson et al. | 307/10 AT |
| 4,670,746 | 6/1987 | Taniguchi et al. | |
| 4,672,375 | 6/1987 | Mochida et al. | |
| 4,688,036 | 8/1987 | Hirano et al. | |

*Primary Examiner*—Ulysses Weldon
*Assistant Examiner*—Ralph E. Smith
*Attorney, Agent, or Firm*—Schwartz, Jeffery, Schwaab, Mack, Blumenthal & Evans

[57] ABSTRACT

A keyless entry system can lock and unlock an automotive vehicle door, a trunk lid, a glove box and/or a steering column without an ignition key. The system comprises a transmitter producing a radio signal indicative of a preset unique code, and a controller receiving the radio signal and performing desired locking or unlocking operation when the code from the transmitter matches a preset code. A manual switch is provided to order the transmitter to transmit the code-indicative radio signal to the controller. The controller is disabled when a preselected vehicle condition is detected, for example the ACC or ON position of an ignition switch or the presence of an ignition key in an ignition key hole.

24 Claims, 10 Drawing Figures

KEYLESS ENTRY SYSTEM FOR AUTOMOTIVE VEHICLE DEVICES WITH THEFT-PREVENTION FEATURE

BACKGROUND OF THE INVENTION

The present invention relates generally to a keyless entry system for operating automotive vehicle devices, such as door lock device, trunk lid opener, glove box key, steering lock device, without mechanical keys. More particularly, the invention relates to a theft-preventive keyless entry system which prevents operation of automotive vehicle devices under preselected conditions.

Conventionally, automotive door locks, trunk lid locks, glove box locks, steering lock devices and so forth in automotive vehicles have been operated by means of ignition or other keys in the past. Recently however, so-called "Keyless Entry Systems", which do not require keys to operate a door locks, a trunk locks, vehicle windows and so forth, have been developed. In the keyless entry system, a keyboard is provided on the external surface of the vehicle body to allow entry of a predetermined code authorizing access to one or more desired vehicle devices. The designated vehicle devices are electrically operated when the entered code matches a predetermined code.

Although such keyless entry systems have been well developed and considered useful because they do not require mechanical keys, a serious problem may occur when the user of the vehicle forgets the predetermined code. If the user is outside of the vehicle and the vehicle door lock device is holding the doors locked, the user cannot unlock the door locks until he remembers the predetermined code.

The present invention provides a novel and more useful system for operating the vehicle devices without an ignition key and without requiring manual entry of a predetermined code.

SUMMARY OF THE INVENTION

It is an object of the present invention to provide a keyless entry system for automotive vehicle devices, which allows one-touch operation of desired vehicle devices without manually entering a code.

Another object of the present invention is to provide a theft-proof keyless entry system which prevents operation of the specified vehicle devices under predetermined conditions.

In order to accomplish the above-mentioned and other objects, a keyless entry system for automotive vehicle devices according to the present invention comprises a wireless code transmitter which is portable by hand or in pockets, and a controller connected to vehicle devices to electrically operate the latter in response to a preset code transmitted from the transmitter. The transmitter transmits a code signal to the controller when one of the vehicle devices is to be operated. The controller is responsive to the code signal, when the transmitted code matches a preset code, produces a driver signal which actuates the designated vehicle device.

In the preferred structure, a switch which activates a transmitter is provided on the external surface of the vehicle body and connected to the controller. When the switch is thrown, the controller transmits a demand signal to the transmitter possessed by the user. The transmitter responds to the demand signal by transmitting the code signal to the controller.

On another preferred structure, a theft-proof system is incorporated in the controller, which disconnects the controller from the vehicle devices under predetermined conditions.

In accordance with one aspect of the invention, a keyless entry system for an automotive vehicle devices comprises an electrical actuator associated with the lock device and responsive a control signal to reverse the position of the lock device, a manual switch manually operable to activate the actuator, a transmitter responsive to operation of the manual switch to output a radio signal indicative of a unique code which identifies the transmitter, a controller for receiving the radio signal from the transmitter, comparing the unique code indicated by the radio signal with a preset code, and producing the control signal when the unique code matches the preset code. A disabling means is connected to the controller for detecting a predetermined disabling condition and disabling the controller when the predetermined disabling condition is detected.

BRIEF DESCRIPTION OF THE DRAWINGS

The present invention will be understood more fully from the detailed description given herebelow and from the accompanying drawings of the preferred embodiment of the present invention, which, however, should not be assumed to limit the invention to the specific embodiments but are for explanation and understanding only.

In the drawings.

DESCRIPTION OF THE PREFERRED EMBODIMENT

Figure 1:
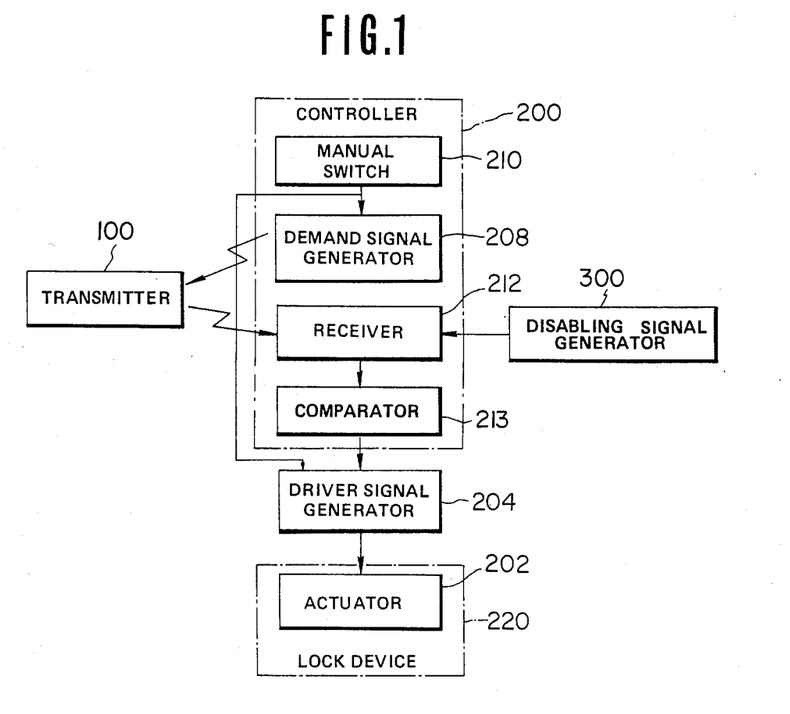
FIG. 1 is a schematic block diagram showing the general concepts of a keyless entry system for an automotive vehicle device according to the present invention.
Figure 2:
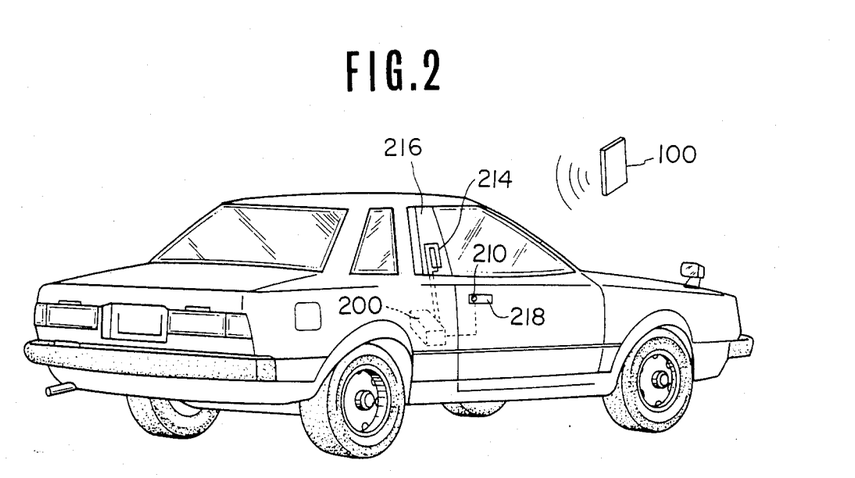
FIG. 2 is a perspective view of an automotive vehicle to which the keyless entry system according to the present invention is applied.

Referring now to the drawings, particularly to FIGS. 1 and 2, the first embodiment of a keyless entry system for an automotive vehicle according to the present invention generally comprises a code transmitter 100 and a controller 200. The controller 200 is connected via a driver signal generator 204 to actuators 202 for vehicle devices such as door lock device, a trunk lid lock device, a groove box lid locks and a steering lock device. The controller 200 is also connected to a disable signal generator 300 which can produce a disable signal to selectably disable the controller. The disable signal generator 300 responds to predetermined conditions by producing the disable signal.

In the first embodiment, the disable signal generator 300 detects when an ignition switch 302 is in a position other than the OFF position. For instance, the disable signal generator 300 outputs the disable signal when the ignition switch 302 is in the ACC position, wherein electric power is supplied to electrical accessories in the vehicle, or the IGN position, wherein electric power is supplied to an engine ignition system and to the electrical accessories, or the START position wherein electric power is applied to a starter motor (not shown).

The controller 200 includes a demand signal generator 208 which sends a demand signal SD to the transmitter 100 to activate the latter. The demand signal generator 208 is connected to one or more manual switches 210 which are placed on the external surface of the vehicle so as to be accessible from outside the vehicle. The demand signal generator 208 produces a demand signal SD when one of the manual switches 210 is depressed.

Figure 3:
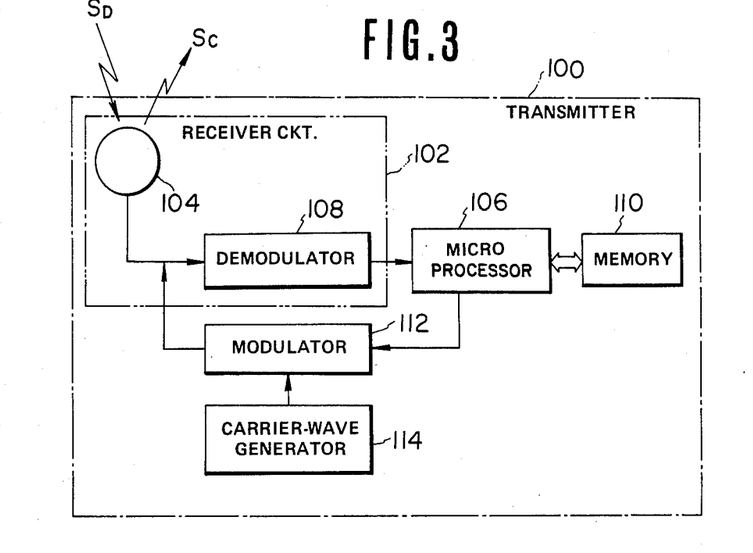
FIG. 3 is a block diagram of a transmitter in the first embodiment of a keyless entry system according to the present invention.

As shown in FIG. 3, the transmitter 100 includes a receiver circuit 102 for receiving the demand signal SD from the controller. The transmitter 100 becomes active when the receiving circuit 102 receives the demand signal SD to produce a code signal SC which is indicative of a preset specific code. The preset code of the portable transmitter 100 differs from that of the demand signal generator 208 so that the controller 200 can recognize when the transmitter 100 is responding.

The transmitter 100 continuously transmits the code signal SC to the controller for as long as it remains active. The code signal SC is received by a receiver 212 in the controller 200. The controller 200 has a comparator 213 to compare the received code with a specific preset code. When the received code matches the code preset as compared in the comparator 213 the controller 200 sends a control signal SL to the driver circuit generator 204. The driver signal generator 204 in turn sends a drive signal to one of the actuators 202 corresponding to the manual switch 210 operated. The actuator 202 in activated by the driver signal from the driver signal generator 204 to operate the corresponding vehicle device.

It should be appreciated that, since the vehicle devices to be operated by the first embodiment of the keyless entry system are two-state locking devices for locking and unlocking vehicle doors, the trunk lid, glove box lid, the steering column and so forth, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which currently unlocked, that vehicle device is then locked.

The transmitter 100 includes a transmitter/receiver antenna 104. In addition, a loop antenna 214 is built into one of the windows 216 of the vehicle. The loop antenna 214 transmits the demand signal SD to and receives the code signal SC from the transmitter 100. As shown in FIG. 2, the manual switches 210 are mounted on an escutcheon 218 of an outside door handle for operation from outside the vehicle.

The transmitter 100 is housed in a case small enough to hand-carry or to pocket.

FIG. 3 shows the circuit structure of the transmitter 100. A microprocessor 106 is connected to the antenna 104 via a demodulator 108 which demodulates the received demand signal SD. The microprocessor 106 includes a memory 110 storing the preset code. In response to the demand signal SD, the microprocessor 106 reads out the preset code to a modulator 112. The modulator 112 is, in turn, connected to a carrier-wave generator 114 to receive a carrier wave. The modulator 112 modulates the carrier-wave with the code-indicative signal from the microprocessor 106 to produce the final code signal SC.

In the preferred embodiment, the antenna 104 of the transmitter 100 is built into the transmitter circuit board or on the surface of the transmitter casing 116 (shown in FIG. 2). The casing 116 is the size of a name card and thin enough to carry in a shirt pocket. The transmitter 100 uses a long-life, compact battery, such as a mercury battery, as a power source.

Figure 4:
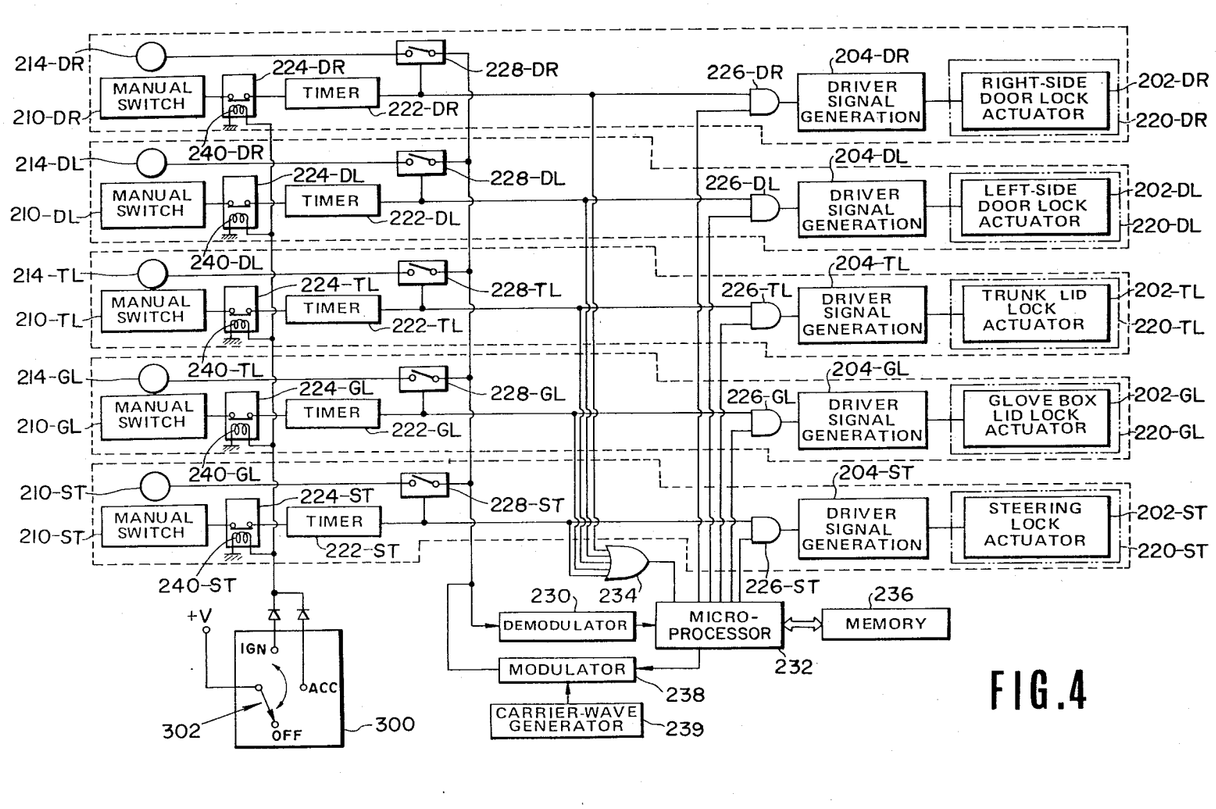
FIG. 4 is a block diagram of a controller in the first embodiment of the keyless entry system according to the present invention.

FIG. 4 shows the circuitry of the controller 200. As set forth above, the shown embodiment of the keyless entry system is adapted to operate the door locks, the trunk lid lock, the glove box lock and the steering lock device. In addition, the shown embodiment is adapted to control operation of the locks for the right- and left-side doors independently. In order to allow independent operation of the lock devices, manual switches 210-DR, 210-DL, 210-TL, 210-GL and 210-ST are provided on the vehicle body somewhere nearby the devices to be operated. For example, the manual switches 210-DR and 210-DL are provided adjacent the door handles of respectively corresponding side soors. Similarly, the manual switch 210-TL to operate the trunk lid lock device would be placed adjacent the trunk lid.

Though the specific embodiment has been illustrated to locate respective manual switches adjacent the corresponding vehicle devices to be operated, it would be possible to provide all of manual switched in concentric manner on the outside door handle escutcheon 218, for example.

Each manual switch is operable independently to operate the corresponding lock device. For example, when the manual switch 210-DR is depressed, the right-side door lock 220-DR is actuated to either to the locked or unlocked state.

Each manual switch 210-DR, 210-DL, 210-TL, 210-GL and 210-ST is connected to a timer 222-DR, 222-DL, 222-TL, 222-GL and 222-ST through a normally closed relay 224-DR, 224-DL, 224-TL, 224-GL and 224-ST. The timers, which will be referred to generically with reference numeral "222", are responsive to depression of the corresponding manual switch, which will be referred to generically with reference numeral "210", to produce a HIGH-level timer signal St for a given period of time. This given period of time should be long enough to cover the time required to transmit the demand signal SD from the controller to the transmitter 100 and to receive the code signal SC from the transmitter in return. The timer signal St is fed to a corresponding AND-gate 226-DR, 226-DL, 226-TL, 226-GL and 226-ST, which will be referred to generically with reference numeral "226". At the same time, the timer signal St is fed to a corresponding switching circuit 228-DR, 228-DL, 228-TL, 228-GL and 228-ST, which will be referred to generically with reference numeral "228". The switching circuit 228 closes in response to the timer signal St to connect the corresponding antenna 214-DR, 214-DL, 214-TL, 214-GL or 214-

ST, which will be referred to generically with reference numeral "214", to a demodulator 230, whereby the code signal SC received by the corresponding antenna 214 is conducted to the demodulator. The timers 222 are also all connected to a microprocessor 232 via a multi-input OR gate 234. The microprocessor 232 includes a memory 236 which stores the preset code corresponding to that stored in the transmitter 100.

It should be noted that the antennas 214-DR, 214-DL, 214-TL, 214-GL or 214-ST are located adjacent respectively corresponding vehicle devices to be operated. For example, the antennas 214-DR and 214-DL are mounted on respectively corresponding side windshields, the antenna 214-TL for operating the trunk lid lock device may be provided on the rear windshield or the edge of rear windshield opening, and antennas 214-ST and 214-GL for steering lock device and the glove box lid lock device may be mounted on the front windshield or along the edge of the front windshield opening.

The microprocessor 232 responds to the timer signal St received via the OR gate 234 by outputting the demand signal SD to the transmitter through a modulator 238 and antenna 214. The modulator 238 is connected to the antenna 214 via the switching circuits 228 to transmit the demand signal SD to the transmitter 100. The microprocessor 232 receives the code signal SC via the antenna 214 and the demodulator 230 and compares the received code with the stored code. When the received code matches the stored code, the microprocessor 232 outputs the control signal SL to the other input terminal of the AND gate 226 corresponding to the depressed manual switch. Therefore, at this time, AND gate 226 transmits a HIGH-level signal to the driver signal generator 204-DR, 204-DL, 204-TL, 204-GL or 204-ST, which will be referred to generically with reference numeral "204". The driver signal generator 204 responds to the HIGH-level signal by outputting a driver signal to the corresponding actuator 202-DR, 202-DL, 202-TL, 202-GL or 202-ST of the lock 220-DR, 220-DL, 220-TL, 220-GL or 220-ST.

The ignition switch 302 serves as the disabling signal generator 300 and is connected to each of the relay coils 240-DR, 240-DL, 240-TL, 240-GL and 240-ST of the relays 224-DR, 224-DL, 224-TL, 224-GL and 224-ST. When the ignition switch 302 is in either the ACC or IGN position, the relay coil 240 is energized to open the relay 224. As a result, electrical communication between the manual switch 210 and the timer 222 is broken. Therefore, as long as the ignition switch 302 remains in either the IGN or ACC position, the keyless entry system is disabled. On the other hand, when the ignition switch is in its OFF position, the relay coil 240 is held deenergized, allowing the relay to close. Therefore as long as the ignition switch remains OFF, the keyless entry system remains active.

Figure 5A:
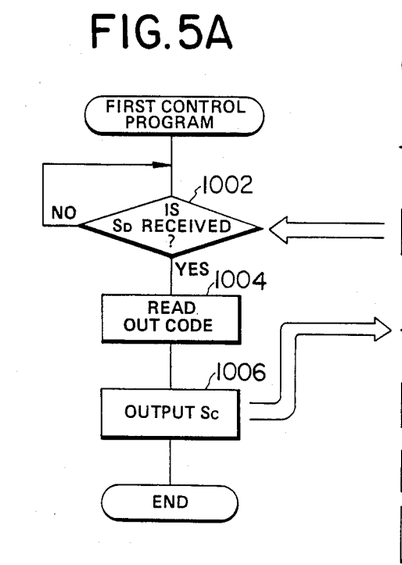
FIGS. 5(A) and 5(B) are flowcharts of the operation of the transmitter and the receiver, respectively.

The operation of the first embodiment the keyless entry system set forth above will be described in more detail with reference to FIGS. 5(A) and 5(B). The microprocessor 106 of the transmitter 100 repeatedly executes the first control program illustrated in FIG. 5(A). In the first control program, the microprocessor 106 checks for receipt of the demand signal SD from the controller at a step 1002. The step 1002 is repeated until the demand signal SD is received. In other words, the transmitter 100 normally remains in a stand-by state, waiting to produce the code signal SC in response to the demand signal SD.

When the demand signal SD is detected at the step 1002, the preset code is read from the memory 110 at a step 1004. The microprocessor 106 then outputs the code-indicative signal to the modulator 112 which in turn outputs the code signal SC in step 1006. Control then returns to the stand-by step 1002.

It should be noted that the code signal SC is transmitted from the modulator to the controller for a given period of time and terminates when the given period of time expires. The given period of time during which the code signal SC is tranmitted is so chosen that the controller 200 can activate the actuator 202 designated by the operated manual switch before expiration of that period. In addition, the code stored in the memory 110 is preferably a binary code, such as an 8-bit serial datum. This binary code rides on the carrier wave as modulated by the modulator to form the code signal SC.

Figure 5B:
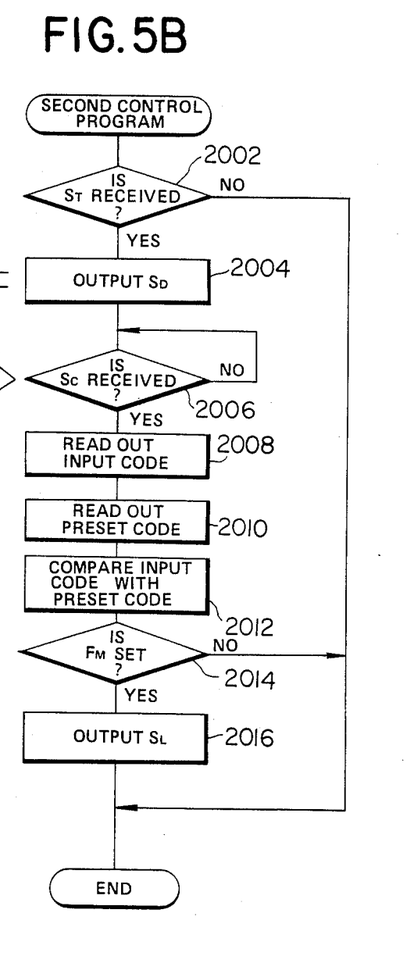

FIG. 5(B) is a flowchart for the controller. At the initial stage of the second control program of FIG. 5(B), the microprocessor 232 checks for receipt of the timer signal St at a step 2002. If the timer signal St is not detected when checked at the step 2002, the second program ends. This is substantially the same as the loop at the step 1002 in FIG. 5(A) and holds the controller in stand-by until depression of a manual switch. When one of the manual switches 210 is depressed and therefore a timer signal St is sent to the microprocessor 232, control passes to a step 2004, in which the modulator 238 is activated to send a demand signal SD to the transmitter 100 to activate the latter. Thereafter, the controller 200 enters a second stand-by state, waiting for the code signal SC. Specifically, a step 2006 is repeated as a loop until the code signal SC is received. After the code signal SC is input via the antenna 214 and the demodulator 230, the received code in the code signal SC is read out at a step 2008. The preset code of the controller 200 is then read out from the memory 236, at a step 2010. The input code and the preset code read out in steps 2008 and 2010 are compared at a step 2012. If the codes match, a matching flag FM is set at the step 2012. The matching flag FM is checked at a step 2014. If the matching flag FM is not set, the program ends. On the other hand, if the matching flag FM is set when checked at the step 2014, then the control signal SL is sent to the driver signal generator at a step 2016.

In the first embodiment as set forth above, since the code signal SC is output only when the demand signal SD is input from the controller, consumption of electric power of the battery in the transmitter is significantly reduced in comparison with system which might employ constant transmission of the code signal SC. Thus, the life-time of the battery of the transmitter is prolonged even though electric power is constantly supplied to the microprocessor to hold same in stand-by. It should be appreciated that the electric power needed to power the microprocessor is substantially smaller than that consumed in transmitting the code signal SC. Therefore, constant power supply to the microprocessor will not significantly affect the life-time of the battery.

Similarly, since the demand signal SD is produced only when at least one of the manual switches is depressed, consumption of the electric power by the controller is significantly limitted.

It is also to be noted that transmission of the demand signal SD and the code signal SC is performed by electromagnetic induction. Since locking and unlocking operations of the lock devices will generally be performed only when the transmitter is near the controller, good communication between the transmitter and the controller can be obtained by electromagnetic induction without significant power consumption.

In order to unlock the right-side door lock device 220-DR, the manual switch 210-DR is depressed. When the ignition switch 302 is in the OFF position, the timer 222-DR becomes active to output the timer signal St. The timer signal St is applied to the AND gate 226-DR and to the switching circuit 228-DR, the latter of which then closes to connect the antenna 214-DR to the microprocessor 232.

The timer signal St from the timer 222-DR is also input to the microprocessor 232 via the OR gate 234. The microprocessor 232 responds inputs from the OR gate 234 by activating the modulator 238 to transmit the demand signal SD via the antenna 214-DR.

The demand signal SD transmitted via the antenna 214-DR is received by the antenna 104 of the transmitter 100. Then, the demand signal SD is demodulated by the demodulator 108 to remove the carrier-wave components. The microprocessor 106 of the transmitter 100 then executes the steps 1004 and 1006 of the first control program of FIG. 5(A) and outputs the code-indicative signal to the modulator 112. The modulator 112 thus transmits the code signal SC to the controller 200 via the antenna 104.

The code signal SC is received by the antenna 214-DR and fed to the demodulator 230. The demodulator 230 demodulates the code signal SC to remove the carrier-wave components. The microprocessor 232 receives the demodulated code signal SC and executes the steps 2008 to 2016 of the second control program. When the input code matches the preset code in the memory 236, the microprocessor 232 feeds the control signal SL to the AND gate 226-DR. At this time, since the timer signal St is still being applied to one of the input terminals of the AND gate, the AND condition of the timer signal St and the control signal SL is established and as a result, the AND gate passes a HIGH-level signal to the driver signal generator 204-DR which produces the driver signal. The driver signal is applied to the actuator 202-DR of the right-side door lock device 220-DR to reverse the lock position. Since the right-side door lock device 220-DR was originally locked, it becomes unlocked upon activation of the actuator 202-DR.

Similarly, when the manual switch 210-DL is closed to operate the left-side door lock device, the antenna 214-DL sends the code signal SC to the microprocessor. If the input code matches the preset code, the AND gate 226-DL opens to activate the driver signal generator 204-DL. Thus, if the left-side door lock device is originally unlocked, it becomes locked.

When the manual switch 210-TL is operated, the timer 222-TL become active to send a timer signal St to the AND gate 226-TL and the switching circuit 228-TL. The switching circuit 228-TL then closes to establish electrical communication between the antenna 214-TL and the demodulator 230 and the modulator 238. The code signal SC is transmitted from the transmitter 100 to the antenna 214-TL in response to the demand signal SD. If the input code is the same as the preset code, then the AND gate 226-TL opens to activate the driver signal generator 204-TL. Therefore, the trunk lid lock device 220-TL switches from its current position to the other position.

When the manual switch 210-GL is operated to open the glove box lid, the timer 222-GL is activated to output the timer signal St. In response to the timer signal St, the switching circuit 228-GL establishes electrical communication between the antenna 214-GL and the demodulator 230. The code signal SC transmitted from the transmitter 100 is thus demodulated by the demodulator and input to the microprocessor 232. The AND gate 226-GL opens in response to the control signal SL from the microprocessor 232 to activate the driver signal generator 204-GL by the gate signal thereof. In response to the driver signal from the driver signal generator 204-GL, the actuator 202-GL become active to reverse the position of the glove box lid lock from locked state to the unlocked state to allow access to the glove box.

In order to release the steering wheel from the locked state, the manual switch 210-ST is depressed. The timer 222-ST becomes active to output the timer signal St for the given period of time. During the period of time in which the timer 222-ST is active, the antenna 214-ST is connected to the microprocessor 232 via the demodulator 230 to receive the code signal SC from the transmitter 100. When the input code matches the preset code in the memory 236, the driver signal generator 204-ST outputs the driver signal to reverse the position of the steering lock device 220-ST from the locked state to the unlocked state.

Figure 6:
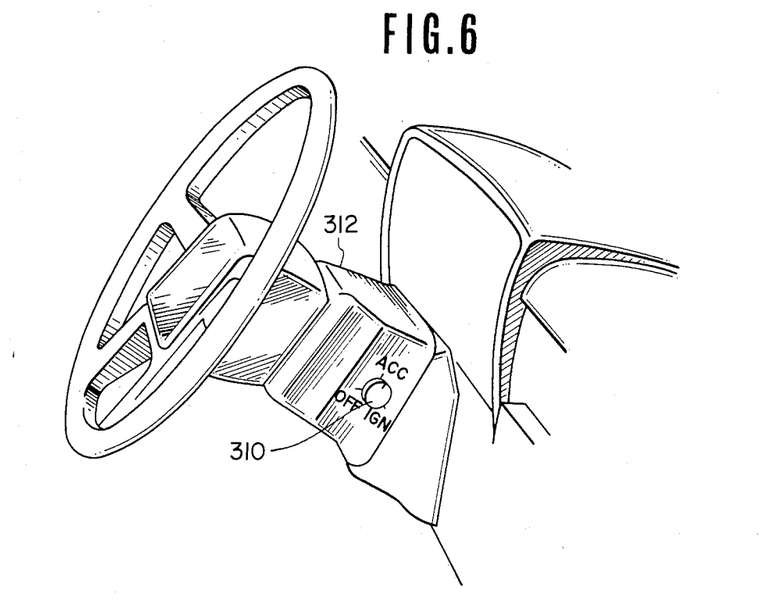
FIG. 6 is a perspective view of a modification of an ignition switch arrangement.

FIG. 6 shows a modification of the ignition switch. In this modification, the ignition switch 302 comprises a rotary switch 310 which can assume any of the OFF, ACC and IGN positions. This rotary switch 310 may replace the conventional ignition key-type ignition switch. As shown in FIG. 6, the rotary switch 310 may be mounted on a steering column 312, similarly to the ignition key-type ignition switch.

Figure 7:
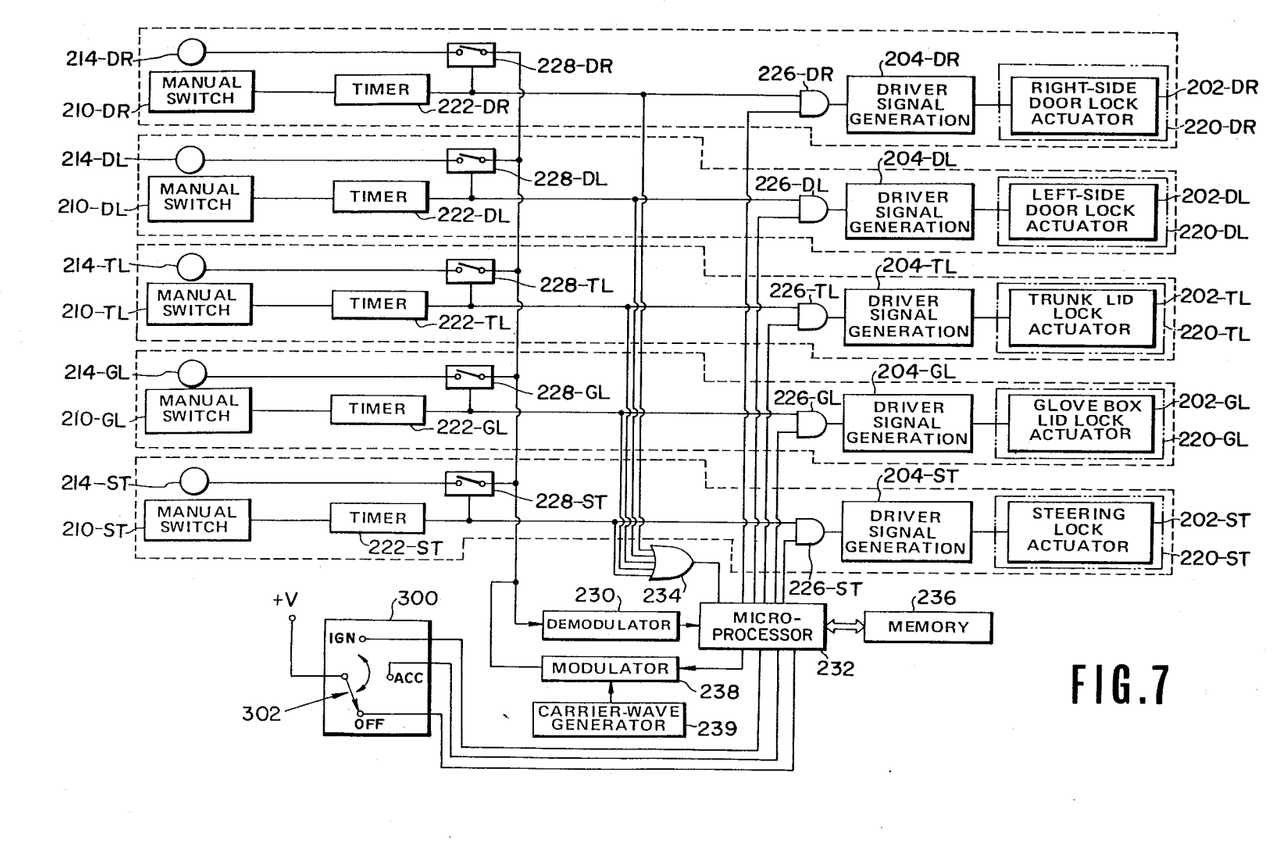
FIG. 7 is a block diagram of a modification of the first embodiment of the keyless entry system of FIG. 4.
Figure 8:
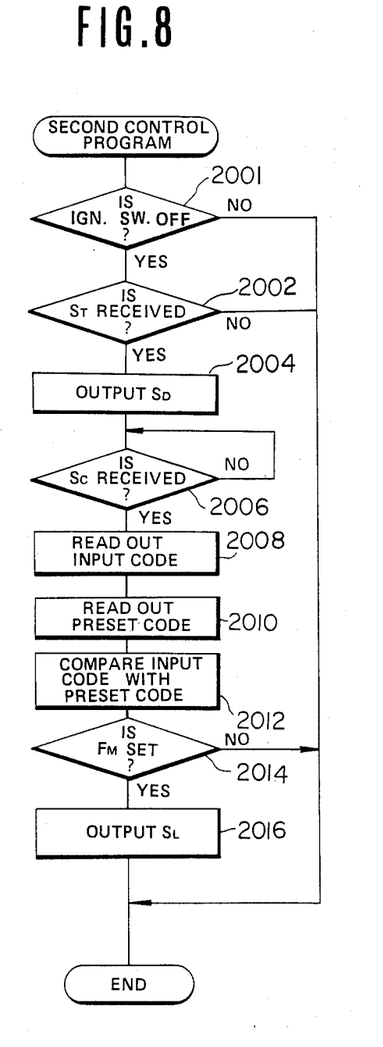
FIG. 8 is a flowchart of a modified second control program to be executed by the controller of FIG. 7.

Although the system is disabled by means of relay circuits 224 in the foregoing first embodiment, this can be performed in the processor program instead. A system employing this modification of the control program is shown in FIGS. 7 and 8. In the modified circuit of FIG. 7, each of the OFF, ACC and IGN terminals of the ignition switch 302 is connected individually to the microprocessor. Thus, each terminal sends a HIGH-level signal to the microprocessor 232 when it is closed.

The microprocessor 232 checks the ignition switch position at the initial stage of execution of the second control program, at a step 2001, as shown in FIG. 8. If the ignition switch is in the OFF position, the microprocessor executes the steps 2002 to 2016 of the second control program. On the other hand, if the ignition switch is not OFF, i.e., if it is in the ACC or IGN position, the program immediately ends. Therefore, despite possible depression of the manual switch 210, the controller remains inactive as long as the ignition switch is in either the ACC position or the IGN position.

Figure 9:
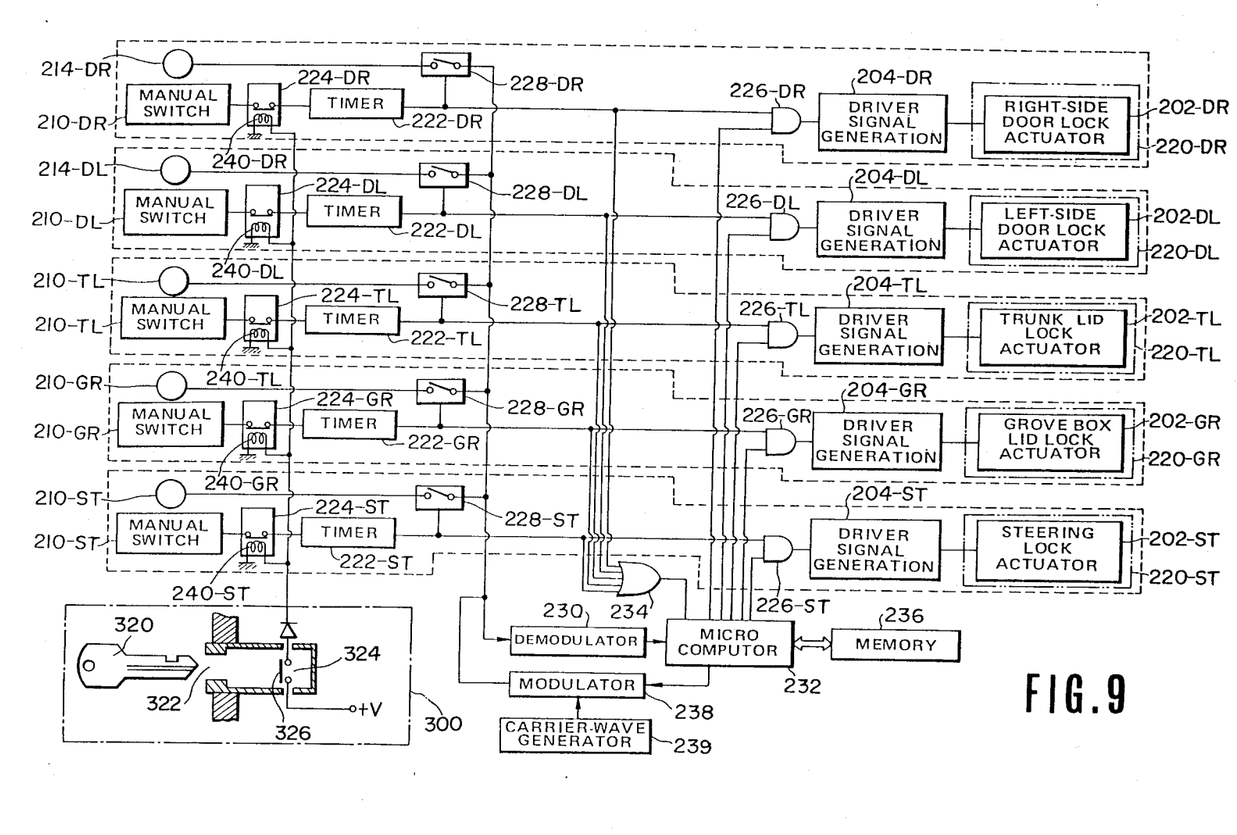
FIG. 9 is a block diagram of the second embodiment of a controller.

FIG. 9 shows the second embodiment of the keyless entry system according to the present invention. In this system, the presence of an ignition key 320 in an ignition switch key hole 322 disables the entry system. In order to detect the presence of the ignition key 320 in the key hole 322, a switch 324 is provided in the key hole. A movable switch element 326 is so disposed as to be displaced into contact with switch contacts 324 by the inserted end of the ignition 320. When the switch 324 is in closed, the relay coils 240 are connected to a power source +V to be energized. The relays 224 open upon energization of the relay coils 240 to break electrical communication between the manual switches 210 and the timers 222.

Therefore, according to the shown second embodiment the keyless entry system remains inoperative as long as the ignition key is in the key hole.

It should be appreciated that the circuitry of the controller 200 of this second embodiment other than the differences set forth above is substantially the same as that of the foregoing first embodiment. Therefore, in order to avoid redundant recitation, detailed description of the other circuit elements in the second embodiment has been neglected.

As will be appreciated herefrom, according to the present invention, the user is now free of the responsibility of memorizing the preset code and need only depress a manual switch corresponding to the desired lock device to be operated. In addition, since the keyless entry system is disabled whenever a predetermined disabling condition is established, which disabling condition is selected from among vehicle conditions which may occur when the user is in the vehicle, unauthorized use of and access to the various compartments of the vehicle can be prevented.

Therefore, the present invention fulfills all of the objects and advantages sought therefor.

What is claimed is:

1. A keyless entry system for an automotive vehicle lock device for selectably actuating the lock device to either of a first position which is a locked position and a second position which is an unlocked position, comprising:
    an electrical actuator associated with the corresponding lock device and responsive to a control signal to reverse the position of said lock device;
    a manual switch;
    a transmitter outputting a radio signal indicative of a unique code which identifies the transmitter when said manual switch is operated;
    controller means for receiving said radio signal from said transmitter, comparing the unique code indicated by said radio signal with a preset code, and producing said control signal when said unique code matches said preset code, for reversing the position of said actuator between said first position and said second position; and
    a disabling means for detecting a predetermined disabling condition for disabling said controller means for at least preventing said actuator from operating said lock device to said first locked position when said lock device is in said second position and said predetermined disabling condition is detected, said disabling condition including a predetermined relationship of a key within a keyslot such that said disabling means disables said controller means when said key assumes said predetermined relationship within said keyslot.

2. The keyless entry system as set forth in claim 1, wherein said transmitter is portable and said controller means is mounted on a vehicle and associated with said manual switch, said controller means being responsive to operation of the said manual switch to produce a radio signal which activates said transmitter to output said unique code-indicative radio signal.

3. The keyless entry system as set forth in claim 1, wherein said key is an ignition key and said keyslot is an ignition keyslot, and said disabling means disables said controller means as long as said ignition is in said ignition key slot.

4. The keyless entry system as set forth in claim 1, wherein said transmitter and said controller means each include an antenna and wherein electromagnetic induction between said antennae allows transmission of said radio signal.

5. The keyless entry system as set forth in claim 1, wherein said transmitter is small enough to fit in a clothing pocket.

6. The keyless entry system as set forth in claim 1, wherein said lock device includes a plurality of devices to be operated independently of each other, said actuator comprises a plurality of actuators respectively operating a corresponding one of said devices, and said manual switch includes a plurality of switch elements respectively adapted to operate a corresponding one of said actuators to operate a corresponding one of said devices.

7. The keyless entry system as set forth in claim 6, wherein said controller means further comprises means, associated with said switch elements, for identifying one of the devices corresponding to one of the switch elements operated.

8. The keyless entry system as set forth in claim 7, wherein each of said switch elements is provided on the vehicle body adjacent to the corresponding device to be operated.

9. The keyless entry system as set forth in claim 1, wherein said lock device is one of a door lock, a trunk lid lock, a glove box lid lock or a steering lock device.

10. The keyless entry system as set forth in claim 7, wherein said plurality of devices includes a door lock, a trunk lid lock, a glove box lid lock and a steering lock device.

11. The keyless entry system as set forth in claim 2, wherein said transmitter and said controller means each include an antenna and wherein electromagnetic induction between said antennae allows transmission of said radio signal.

12. The keyless entry system as set forth in claim 1, wherein said key is an ignition key and said keyslot is an ignition switch keyslot and said disabling means disables said controller means whenever said key causes said ignition switch to be not in its OFF position.

13. The keyless entry system as set forth in claim 6, wherein said key is an ignition key and said keyslot is an ignition switch keyslot, and said disabling means disables said controller means as long as said ignition key is in said ignition key slot.

14. The keyless entry system as set forth in claim 6, wherein said transmitter is small enough to fit in a clothing pocket.

15. The keyless entry system as set forth in claim 12, wherein said lock device is one of a door lock device, a trunk lid lock device, a glove box lid lock device or a steering lock device.

16. The keyless entry system as set forth in claim 12, wherein said lock device comprises a door lock device, a trunk lid lock device, a glove box lid lock device and a steering lock device, and said manual switch includes a plurality of switch elements, each of which corresponds to one of said lock devices.

17. A keyless entry system for an automotive vehicle for operating one of a plurality of vehicle devices including a door lock device which is selectively operated to either of a first position which is a locked position or a second position which is an unlocked position, comprising:

a plurality of electrical actuators respectively associated with the corresponding vehicle devices and responsive to a control signal to operate said corresponding vehicle device to a desired position, which includes a door lock actuator for operating said door lock device between said first locked position and said second unlocked position;

a plurality of manual switches, each operating one of the corresponding vehicle devices;

a transmitter outputting a radio signal indicative of a unique code which identifies the transmitter when one of said manual switches is manually operated;

controller means for receiving said radio signal from said transmitter, comparing the unique code indicated by said radio signal with a preset code, and producing said control signal when said unique code matches said preset code, said controller means including means responsive to manual operation of one of said manual switches for identifying a corresponding one of said actuators to be operated and operating said identified actuator for operating one of the vehicle devices corresponding to the one manual switch operated; and a disabling means for detecting a predetermined disabling condition and for disabling said controller means when said predetermined disabling condition is detected, said predetermined disabling condition comprising a predetermined position of a key within a keyslot such that said disabling means disables said controller when said key assumes said predetermined position within said keyslot.

18. The keyless entry system as set forth in claim 17, wherein said transmitter is portable and said controller means is mounted on a vehicle and associated with said manual switches, said controller means being responsive to operation of said manual switches to produce a demand radio signal said transmitter responsive to said demand radio signal for outputting said unique code-indicative radio signal.

19. The keyless entry system as set forth in claim 18, wherein said key is an ignition key and said keyslot is an ignition switch keyslot and said disabling means disables said controller means whenever said key causes said ignition switch to be not in its OFF position.

20. The keyless entry system as set forth in claim 18, wherein said key is an ignition key and said keyslot is an ignition switch keyslot, and said disabling means disables said controller means as long as said ignition key is in said ignition key slot.

21. The keyless entry system as set forth in claim 17, wherein said transmitter and said controller means each include an antenna and wherein electromagnetic induction between said antennae allows transmission of said radio signal.

22. The keyless entry system as set forth in claim 17, wherein said transmitter is small enough to fit in a clothing pocket.

23. A keyless entry system for an automotive vehicle lock device for selectably actuating the lock device to either of a first position which is a locked position or a second position which is an unlocked position, comprising:

an electrical actuator associated with the corresponding lock device and responsive to a control signal to reverse the position of said lock device;

a manual switch;

a transmitter outputting, in response to a demand signal, a radio signal indicative of a unique code which identifies the transmitter;

controller means responsive to manual operation of said manual switch for transmitting said demand signal, for receiving said radio signal from said transmitter, for comparing the unique code indicated by said radio signal with a preset code, and for producing said control signal when said unique code matches said preset code so as to reverse the position of said lock device between said first position and said second position; and disabling means detecting a presence of an ignition key inserted in an ignition key cylinder of an ignition switch for disabling said controller means from producing said control signal so as to prevent said actuator from actuating said lock device to said first locked position when the presence of the ignition key in the ignition key cylinder is detected.

24. A keyless entry system for an automotive vehicle lock device for selectably actuating the lock device to either of a first position which is a locked position or a second position which is an unlocked position, comprising:

an electrical actuator associated with the corresponding lock device and responsive to a control signal to reverse the position of said lock device;

a manual switch;

a transmitter outputting, in response to a demand signal, a radio signal indicative of a unique code which identifies the transmitter;

controller means responsive to manual operation of said manual switch, for transmitting said demand signal, for receiving said radio signal from said transmitter, for comparing the unique code indicated by said radio signal with a preset code, and for producing said control signal when said unique code matches said preset code so as to reverse the position of said lock device between said first position and said second position; and disabling means detecting an ignition switch positioned other than OFF for disabling said controller means from producing said control signal so as to prevent said actuator from operating said lock device to said first locked position when said ignition switch position other than OFF position is detected.

* * * * *